June 3, 1952  G. NEMETZ  2,599,195
LUBRICATING PUMP
Filed July 29, 1947
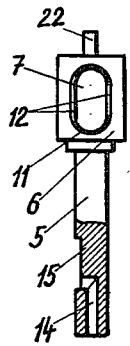
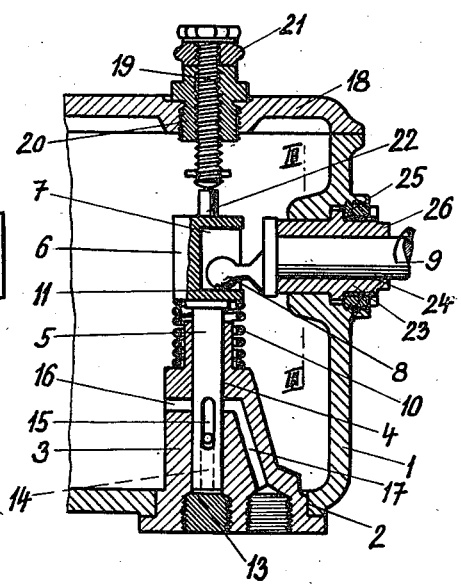
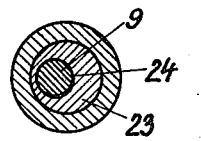
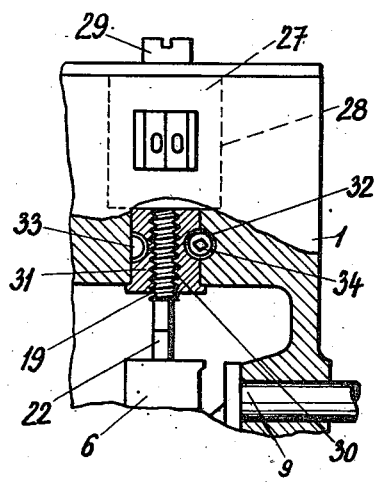
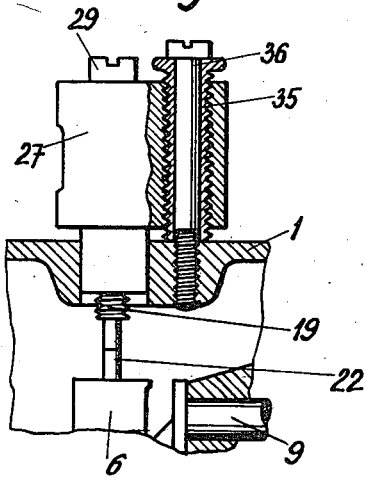
INVENTOR
VALERIE NEMETZ ADM.
FOR GUSTAV NEMETZ DECD.
BY
Robert E. Burns
ATTORNEY Patented June 3, 1952

2,599,195

UNITED STATES PATENT OFFICE 2,599,195

LUBRICATING PUMP

Gustav Nemetz, deceased, late of Vienna, Austria, by Valerie Nemetz, administratrix, Vienna, Austria, assignor to Alex. Friedmann, Kommandit-Gesellschaft, Vienna, Austria Application July 29, 1947, Serial No. 764,525
In Germany April 11, 1944

Section 1, Public Law 690, August 8, 1946
Patent expires April 11, 1964

10 Claims. (Cl. 184—27)

This invention relates to a lubricating pump, the quantity delivered by which is adjustable. Such lubricating pumps are usually made with a plurality of pump units housed in a common pump casing, each of which itself represents a small pump, the quantities delivered by these pump units being independently adjustable. Experience has shown, that with such pumps there is always the disadvantage that, after assembly, the setting of the device for adjusting the quantity delivered is no longer correct. When set to zero, for instance, that is to say an adjustment, at which the pump does not deliver at all, it is required, on regulating the adjusting device, that a delivery will start immediately, which will gradually increase as the adjustment continues. Should the setting be incorrect, however, it follows that, on the regulating device being adjusted to no delivery, the pump unit will either already deliver or only commence delivering after a certain adjustment of the regulating device. This renders the delivery of the pump or of the pump units uncontrollable. The reasons for this are the manufacturing tolerances in the dimensions of the individual parts of the lubricating pump. In order to obtain a correct adjustment, it has hitherto been necessary after each assembly of the pump to adapt each of its devices for adjusting the quantity of delivery to the pump unit in question by finishing work, which was troublesome and could only be carried out by skilled labor. If in the course of time parts of a pump unit or of a quantity adjusting device should have become defective, it was necessary, when replacing it, to carry out such subsequent work again.

Now the invention has for its object to avoid these disadvantages and consists more particularly in this, that for adjusting the quantity delivered by the pump or each pump unit of the same at least two separately actuatable adjusting devices are provided. One of these adjusting devices can be used for regulating the quantity delivered and the other for correcting the regulating position. According to the invention, therefore, only one of the adjusting devices need cover the whole of the desired regulating range, while the other covers only a portion thereof, the adjusting device controlling the part of the regulating range influencing the effect of the adjusting device covering the whole regulating range on the pump unit or the like.

The arrangement according to the invention may be such that the adjusting device controlling the partial regulating range displaces the setting range of the setting arrangement controlling the whole regulating range. When, for instance, the setting arrangement regulating the quantity delivered is formed by a set screw, the whole support of this set screw may be made displaceable on the pump casing in a simple manner. In another modification of the invention the setting device controlling the partial regulating range can displace the operative range of the pump unit as such with respect to the setting device controlling the whole regulating range, whereby the effect of the regulating device on the pump unit is again altered.

The invention thus makes possible an accurate and controllable adjustment of the quantity delivered by the pump units of a lubricating pump or, in the case of single pumps, of the pump itself, without any difficult or time wasting subsequent work on the parts when assembling the pump. This also enables the tolerances during manufacture to be increased and greatly reduces waste.

The invention is illustrated diagrammatically by constructional examples in the accompanying drawing, in which Fig. 1 shows a portion of a lubricating pump in section, whilst Fig. 2 shows a detail and Fig. 3 a further detail in section on line III—III of Fig. 1.

Figs. 4 and 5 show two further constructional examples in part section, the device for setting the quantity delivered comprising an indicator for reading off the particular adjustment.

In the lubricating pump shown in Fig. 1 the pump units are inserted from below into the pump casing 1 through openings 2. The cylinder 3 of a pump unit contains in its bore 4 the pump piston 5. The piston head 6 with a slot 7 embraces a ball pivot 8 of the driving shaft 9. A spring 10 forces the pump piston 5 upwards, the lower surface 11 of the slot 7 bearing against the ball pivot 8. Thus, on the ball pivot 8 moving upwards, which has a rotary motion in the direction of the arrow imparted to it by the driving shaft 9, the suction stroke of the pump piston 5 and, on the part 8 moving downwards, the compression stroke is brought about.

Through the movements of the ball pivot 8 perpendicular to the plane of the drawing, in which part 8 lies, as shown in Fig. 2, so as to fit between the vertical walls 12 of the slot 7, the piston 5 has a pivotal motion about its axis imparted to it. The control of the working space 13 of the pump unit is effected in a known manner by a control slot 15 which through an axial bore 14 of the piston 5 is always connected with the working space 13 and during the rotary motion of the piston alternately connects the working space 13 with the suction duct 16 or the pressure duct 17.

The changing of the quantity delivered is effected by a setting device provided on the cover 18 of the pump casing 1 and formed by a set screw 19. The set screw 19 is guided in the female thread of a sleeve 20 screwed into the cover 18, being secured in its vertical position by a lock nut 21.

A pin 22 of the piston head 6 strikes against the lower end of the set screw 19, whereby according to the setting of the set screw 19 the suction stroke of the piston 5 and with it the delivery stroke of the same is limited. With the set screw 19 in its lowest position, as shown in the drawing, the piston 5 is to be held in such a manner that the gyrating ball pivot 8 just makes contact with the end surface 11 of the slot 7 in the piston head 6, so that the piston performs no stroke at all. This position of the set screw 19, in which its head clamps the lock nut 21 against the sleeve 20, thus corresponds to the non-delivery adjustment of the pump unit. On the set screw 19 being screwed upwards, delivery is to start immediately the pump is put into operation, the quantity delivered increasing gradually according to the displacement of the set screw 19, until the greatest stroke of the piston 5 determined by the eccentricity of the ball pivot 8 is reached.

After assembly, however, this desired zero adjustment will in general not be established. For this reason a second setting arrangement is provided. This consists of a sleeve 23 which has an eccentric bore 24, in which the shaft 9 is supported (see also Fig. 3). On the sleeve 23 being turned with the aid of a key applied at 26 after easing the screw ring 25, the circular path of the ball pivot 8 is raised or lowered, so that the operative range of the piston 5 with respect to the set screw 19 is displaced and by this means, with the set screw 19 in the position shown, the arrangement can be accurately adjusted to no delivery. Through this second adjusting arrangement it thus becomes possible to bring the zero position of the device for setting the quantity to be delivered into agreement with the non-delivery of the pump unit without any subsequent work on the parts.

For applying the invention, the particular construction of the pump or pump unit and of its arrangement for adjusting the quantity to be delivered is immaterial. Thus, for instance, the pump units may be constructed with a delivery and a control piston. The setting arrangement controlling the whole regulating range, which serves the purpose of altering the quantity delivered, may itself be displaced by the second setting arrangement controlling the partial range and thus be adapted to the pump unit.

A delivery quantity setting device with an indicator on which the setting can be read off each time, such as that shown in Fig. 4 can also be used. The indicator 27 is mounted in a recess 28 of the pump casing 1 and is adjustable by means of a screw driver inserted in a slit of the indicator shaft 29, whereby the regulating member coupled with the indicator shaft, namely the set screw 19, is turned in the female thread 30 and displaced in the axial direction for varying the quantity delivered by the corresponding pump unit. The part 31 containing the female thread 30 is not displaceable axially, but supported in the casing 1 so as to be rotatable about the axis of the set screw 19. By means of a worm 32 which engages in the worm thread 33 of the part 31 the latter part can be turned by inserting a plug key in the hollow square 34 of the part 31 and the set screw 19 be moved upwards and downwards without the setting of the indicator 27 being changed. The agreement, for instance, of the zero setting of the delivery quantity setting device and of the indicator 27 with the non-delivery of the pump unit can in this way be brought about without any subsequent work on the pump parts.

A similar arrangement is shown in Fig. 5, in which however the indicator 27 together with the set screw 19 can be displaced upwards and downwards by a screw sleeve 35. After reaching the correct zero position, the screw sleeve 35 is clamped in position by a screw 36.

What is claimed is:

1. A lubricating pump, comprising a casing, a piston reciprocating in said casing, means for actuating said piston, an adjusting member acting only on said piston for controlling the stroke of said piston, lubricant delivery indicator means operatively associated with said stroke control member for indicating the setting of said stroke control, and corrective piston stroke controlling means accessible from outside the casing and acting only on said piston for effecting coincidence of actual lubricant delivery with the stroke setting as indicated by said lubricant delivery indicator means.

2. A lubricating pump according to claim 1 wherein said controlling means has a controlling range over substantially the entire piston stroke and said corrective means has controlling range over a fraction of said stroke.

3. A pump according to claim 1, wherein said corrective means comprises an element rotatably disposed in said casing for receiving said stroke controlling member, means for adjusting the position of said member with respect to said element, and means for rotating said element to effect a correction in the setting of said member.

4. A pump according to claim 1, wherein said corrective means comprises an element for receiving said stroke controlling member, and means for varying the axial position of said element with respect to said casing, whereby the position of said member is rendered adjustable independent of the stroke setting.

5. A pump according to claim 1, wherein said stroke controlling member comprises a set screw in said casing disposed in the path of said piston.

6. A pump according to claim 5, wherein said corrective means comprises an element having a female thread for receiving said set screw and is arranged in said casing for adjustment in an axial direction.

7. A pump according to claim 5, wherein said corrective means comprises an element having a female thread for receiving said set screw and is arranged for rotation in said casing.

8. In a pump according to claim 7, including a worm gear and worm screw arrangement for adjusting the angular position of said rotatable element.

9. A pump according to claim 1, wherein said actuating means comprises a rotatable eccentric member acting on said piston and said corrective means comprises means for shifting the axis of rotation of said eccentric member.

10. A pump according to claim 9, wherein said corrective means comprises an eccentric bearing bushing for the shaft of said eccentric member and means for varying the rotational position of said bushing.

VALERIE NEMETZ,
*Executrix or Administratrix of the Estate of Gustav Nemetz, Deceased.*

REFERENCES CITED

The following references are of record in the file of this patent:

UNITED STATES PATENTS

| Number | Name | Date |
|---|---|---|
| 923,832 | Hancock | June 8, 1909 |
| 1,723,544 | Etzelt | Aug. 6, 1929 |

FOREIGN PATENTS

| Number | Country | Date |
|---|---|---|
| 22,519 | France | Jan. 28, 1921 |
| 456,967 | France | July 1, 1933 |
| 471,070 | France | July 1, 1914 |
| 447,103 | Germany | July 18, 1927 |